United States Patent [19]

Opsahl

[11] Patent Number: 4,726,146
[45] Date of Patent: Feb. 23, 1988

[54] HOLD-OPEN LOCK

[75] Inventor: Allan W. Opsahl, Renton, Wash.

[73] Assignee: The Boeing Company, Seattle, Wash.

[21] Appl. No.: 902,475

[22] Filed: Aug. 29, 1986

[51] Int. Cl.$^4$ .............................................. E05D 11/00
[52] U.S. Cl. ....................................... 49/383; 16/332; 16/348; 16/349; 292/277
[58] Field of Search ................................. 49/383, 394; 292/DIG. 17, 277; 16/82, 324, 325, 332, 348, 349

[56] References Cited

U.S. PATENT DOCUMENTS

| | | | |
|---|---|---|---|
| 1,554,828 | 9/1925 | Reinhold | 292/277 X |
| 2,621,359 | 12/1952 | Schuyler | 16/332 |
| 2,890,478 | 6/1959 | Young | 49/383 X |
| 3,030,653 | 4/1962 | Eiholzer | 16/82 |
| 3,051,983 | 9/1962 | Dale | 16/82 |
| 3,131,421 | 5/1964 | Kurowski | 16/82 |
| 3,164,404 | 1/1965 | Arnold | 292/273 |
| 3,206,239 | 9/1965 | Wang | 49/383 X |
| 3,561,036 | 2/1971 | Crane | 16/49 |
| 3,986,742 | 10/1976 | Heaney | 292/268 |
| 4,064,652 | 12/1977 | Johnston | 49/394 |
| 4,292,707 | 10/1981 | Williams | 16/48.5 |
| 4,339,844 | 7/1982 | Shatters | 16/82 |

Primary Examiner—Philip C. Kannan
Attorney, Agent, or Firm—Bruce A. Kaser

[57] ABSTRACT

A locking device is provided for holding an aircraft door in an open position. The device includes a first member connected to the door which moves in correspondence with door opening and closing. A second member of the device is fixedly connected to aircraft structure that supports the door. A locking pin, connected to the first member, is engaged with a pin receiving opening in the second member when the door is fully open to hold the door in such position. The pin is movable axially by a manually operated lever to disengage the pin when it is desired to close the door.

6 Claims, 14 Drawing Figures

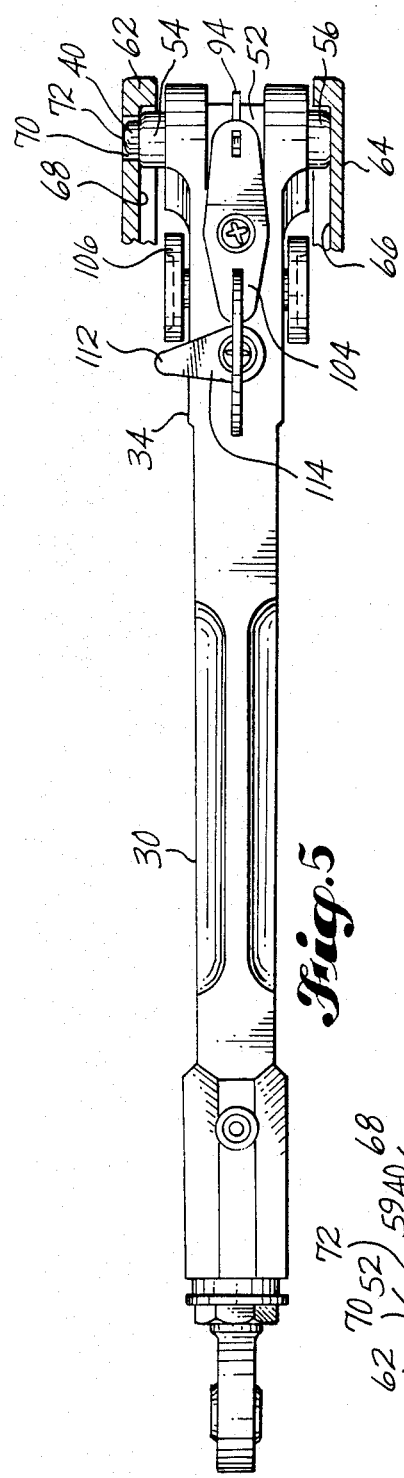
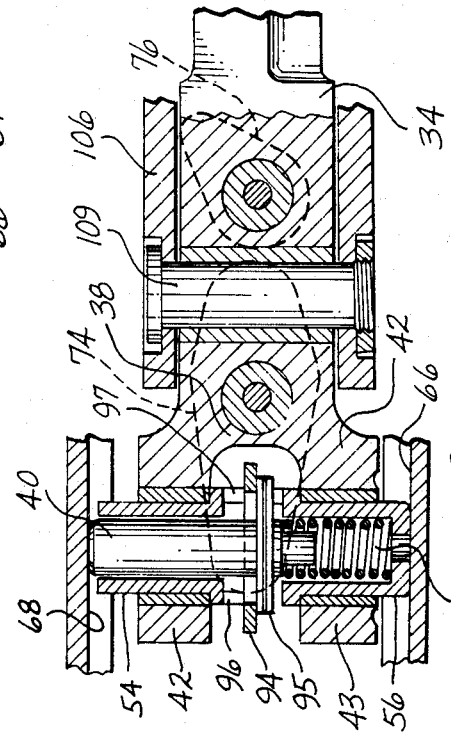
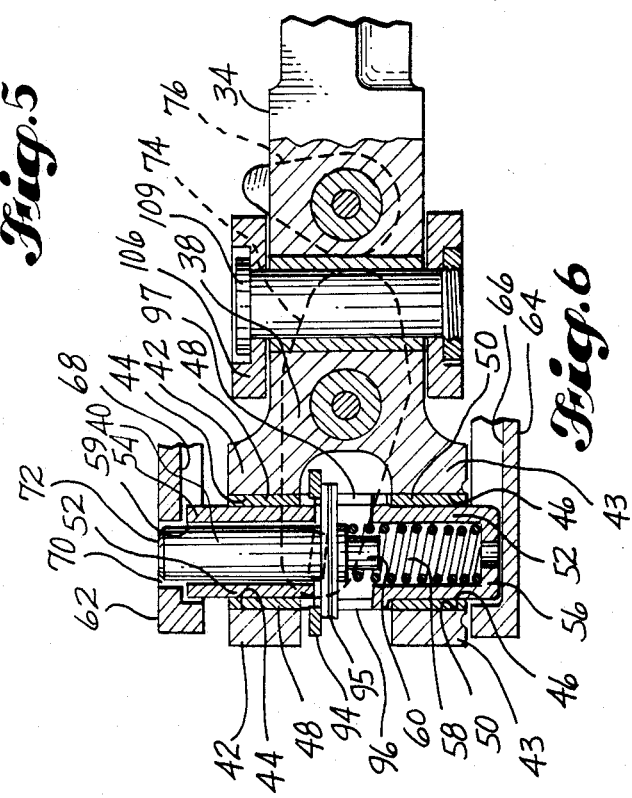

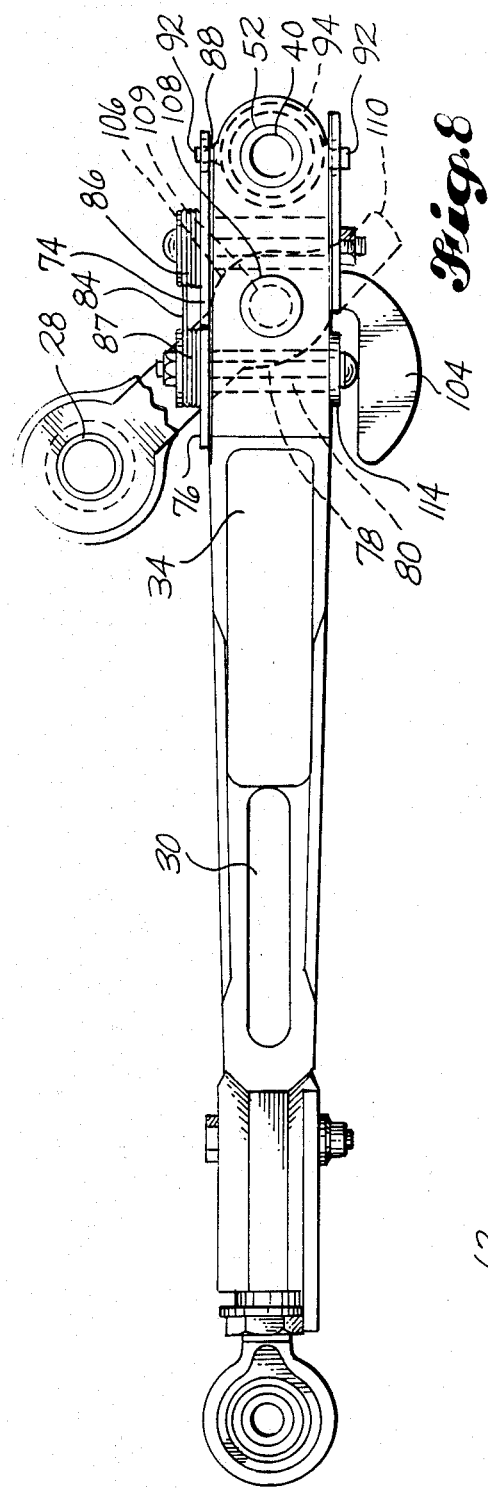
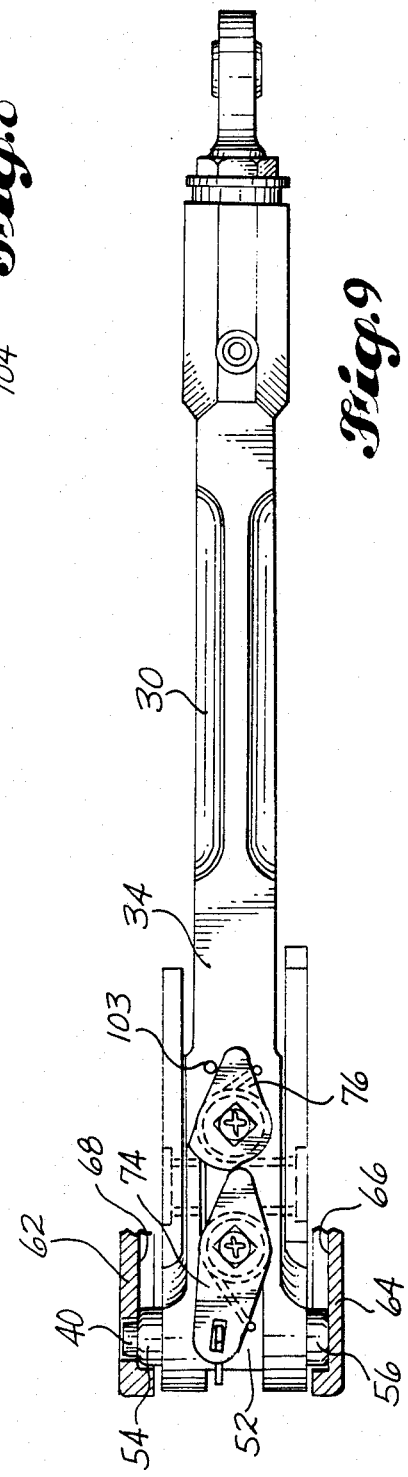

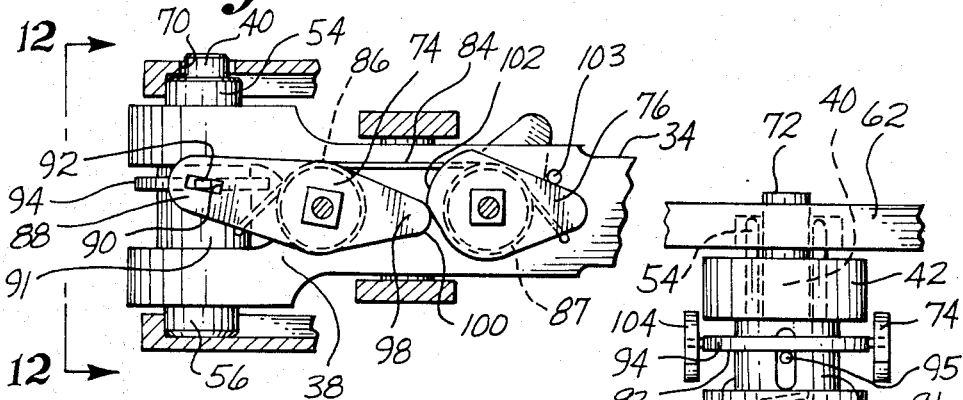
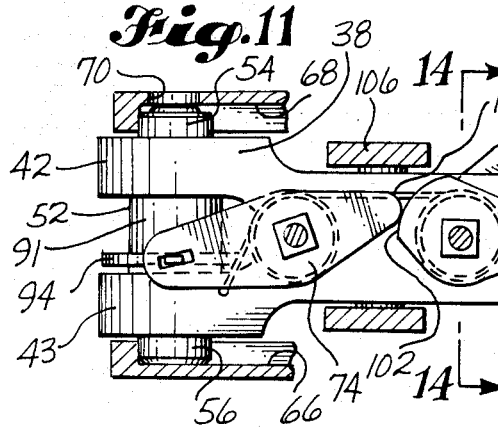
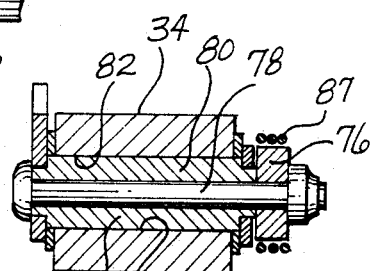
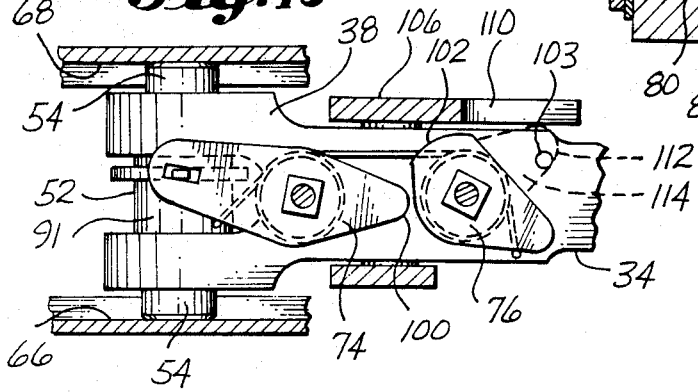

HOLD-OPEN LOCK

TECHNICAL FIELD

This invention relates to door locking devices, and in particular, to specialized locking devices which may be used for holding a door open.

BACKGROUND ART

The subject matter of the invention is directed particularly toward application in doors of commercial aircraft. It is known that relatively high forces are initially required to move this type of door from an open to closed position. Typically, a flight attendant is responsible for closing the door, and it is desirable that he have the ability to use both of his hands to initiate door closing, and that he further have the ability to position his body in the most advantageous position possible for pulling on the door during closing. Previous types of hold-open locking devices used in aircraft doors have interfered with this. For example, past devices have required the door operator to disarm the device with one hand while at the same time using the other hand to initiate door closing.

The present invention provides a new type of hold-open locking device. This invention provides an improvement over the prior art in that it permits the door operator to first unlock the device when the door is open and prior to initiation of door closing. The device maintains an unlocked condition during initial closing but automatically rearms in a manner so that when the door is reopened it is automatically locked in the open position. This device therefore permits the operator to use both hands and to position his body to the best advantage during closing.

DISCLOSURE OF THE INVENTION

A locking device is provided for holding open an aircraft door that is mounted to fuselage structure. The door provides passenger ingress and egress to and from the aircraft.

The invention includes a first member connected to the door which moves between locked and unlocked conditions in correspondence with opening and closing movement of the door. The first member is in a locked condition, for example, only when the door is fully open, and in an unlocked condition when the door is moved from being fully open to closed, and vice versa.

The first member has a portion that includes a locking device which is engageable with a second member fixedly connected to the fuselage structure. The second member provides a structurally defined path which guides movement of the locking device portion of the first member during door opening and closing. When the door is fully open, the locking device fixedly engages with the second member and holds the door in place. This is accomplished by a locking pin in the device that is movable along an axis between an engagement position and a nonengagement position. The second member has an opening positioned to receive and engage with an end of the pin when the locking device is in a position corresponding to a fully open door.

The locking device further includes a first spring, connected to the locking pin, that is biased for normally moving the pin along the axis toward the engagement position. The pin is moved into nonengagement and against the bias of the spring by a lever member that is pivotally connected to the first member. The lever member has a portion drivingly connected to the pin in a manner so that the pin moves into nonengagement when the lever is pivoted in a first counter-clockwise direction. The lever member also has a cam lobe portion that moves along an arcuate path as the lever member pivots.

A second spring is connected to the lever member and is biased for normally pivoting the lever member in a second clockwise direction that opposes the first. This second spring would therefore normally cause the lever member to pivot clockwise, which would permit the first spring to move the locking pin into engagement with the opening in the second member.

A cam member is pivotally connected to the first member and is positioned adjacent the lever member. This cam member has a cam lobe portion normally positioned to project into the arcuate path the lever member's cam lobe portion travels as the lever member pivots. Connected to the cam member is a third spring biased for normally pivoting the cam member in a counter-clockwise direction. When the lever member is turned counter-clockwise, which would be done manually by the door operator to disengage the locking pin, the lobe portion of the lever member slides against the lobe portion of the cam member and pivots the cam member clockwise against the third spring's bias thereby causing the lobe portion to move out of the arcuate path. The lever member's cam lobe portion then bypasses the cam member's lobe portion and the third spring causes the cam member to pivot back to a normal position so that its lobe portion once again projects into the arcuate path. This prevents the second spring from causing the lever member to pivot back in the clockwise direction after the lever member has been released by the operator, and causes the locking pin to be held in nonengagement, thus unlocking or disarming the device.

A means is provided for arming the device in response to movement of the first member corresponding to door movement after the device has been unlocked. The lock arming means causes the cam member's lobe portion to once again pivot clockwise, but only a sufficient amount so that its lobe portion once again moves out of the above-described arcuate path, thereby permitting the second spring to pivot the lever member clockwise. The lever member is connected to the locking pin in a manner so that it makes contact with and pushes the pin into nonengagement when rotated counter-clockwise. However, when rotated clockwise it no longer pushes against the pin thus permitting the first spring to move the pin into engagement with the opening in the second member when the door becomes fully open.

BRIEF DESCRIPTION OF THE DRAWINGS

In the drawings, like reference numerals and letters refer to like parts throughout the various views, and wherein:

FIG. 5 is an elevational view showing one side of the guide bar shown in FIGS. 3 and 4, and shows the locking device in the right end thereof;

FIG. 6 is an enlarged fragmentary cross-sectional view of the locking device in the right end of the guide bar shown in FIG. 5, but looking from a direction in back of the bar, and shows a locking pin in the device engaged with a second member;

FIG. 7 is a view like FIG. 6 but shows the change in position of the locking pin when the guide bar of FIG. 5 has moved away from a locking position;

FIG. 8 is a top plan view of the guide bar shown in FIGS. 3-5, and shows a hinge link interconnecting the locking device with the axis about which the link arm in FIGS. 3 and 4 pivots;

FIG. 9 is an elevational view of the other side of the guide bar shown in FIG. 5;

FIG. 10 is a side pictorial view of the locking device shown in FIG. 6;

FIG. 11 is a view like FIG. 10, but shows how the relative movement of a lever member and a cam member is used to disengage the locking pin shown in FIGS. 6 and 7;

FIG. 12 is an end view of the guide bar taken along line 12—12 in FIG. 10;

FIG. 13 is a view like FIGS. 10 and 11 and shows relative movement of the lever member and cam member to arm the locking device; and FIG. 14 is a cross-sectional view taken along line 14—14 in FIG. 11.

BEST MODE FOR CARRYING OUT THE INVENTION

Figure 1:
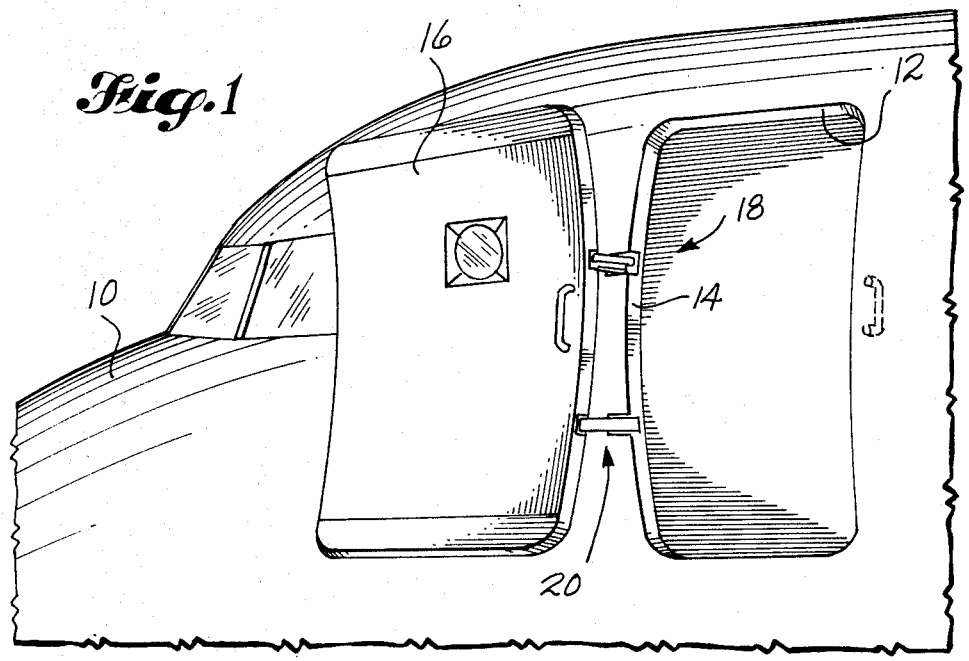
FIG. 1 is a fragmentary pictorial view of the forward portion of a commercial aircraft fuselage near the cockpit, and shows an open door mounted to fuselage structure by upper and lower hinges.
Figure 2:
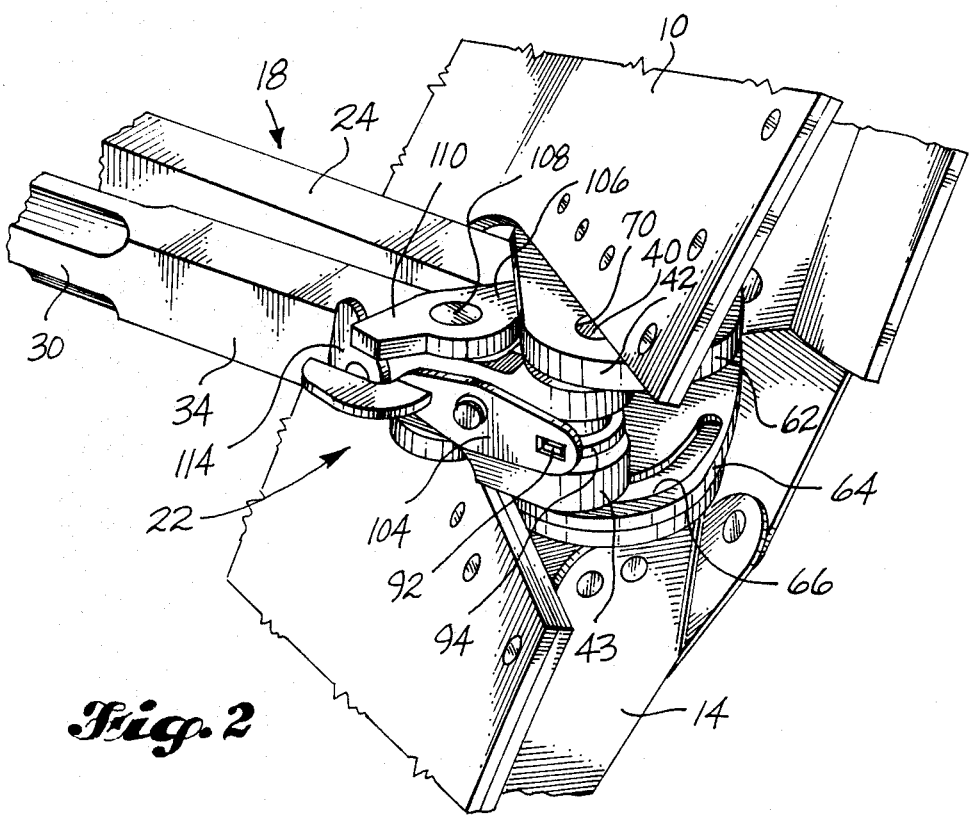
FIG. 2 is an enlarged fragmentary pictorial view of the upper hinge shown in FIG. 1, and provides a pictorial view of a locking device constructed in accordance with a preferred embodiment of this invention.

Referring now to the drawings, and first to FIG. 1, therein is shown a forward portion of an aircraft fuselage 10. The fuselage 10 has a portal 12 which provides passenger ingress and egress to and from the fuselage. Mounted to fuselage structure 14, and on the left-hand side of the portal 12, is a door 16. The door 16 is mounted by means of upper and lower hinge structures which are generally indicated, respectively, by arrows 18 and 20. Referring to FIG. 2, which shows the upper hinge structure 18, therein is shown at 22 a locking device constructed in accordance with a preferred embodiment of the invention.

Figure 3:
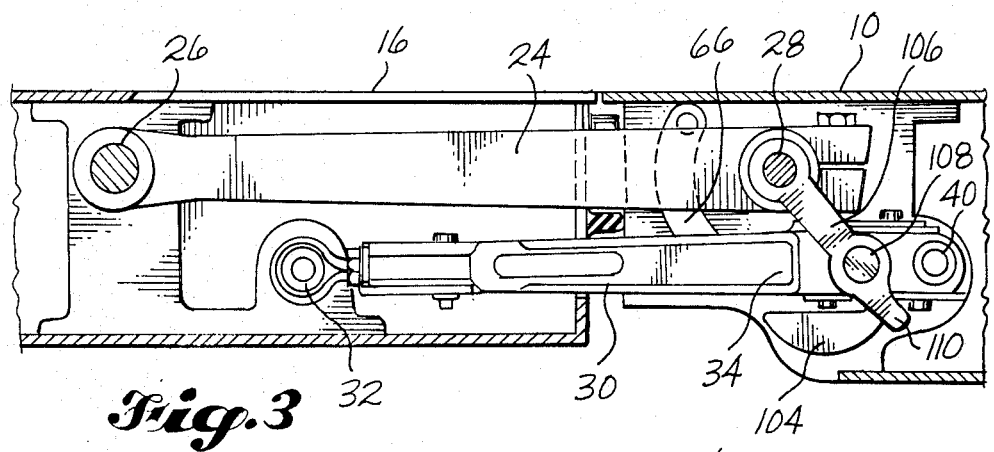
FIG. 3 is a top plan view taken through a section of the door and fuselage structure shown in FIG. 1 when the door is closed, and shows two generally horizontally extending bars, the upper of which is a link bar that pivotally connects the door to the fuselage, and the lower is a guide bar to which the locking device shown in FIG. 2 is connected.
Figure 4:
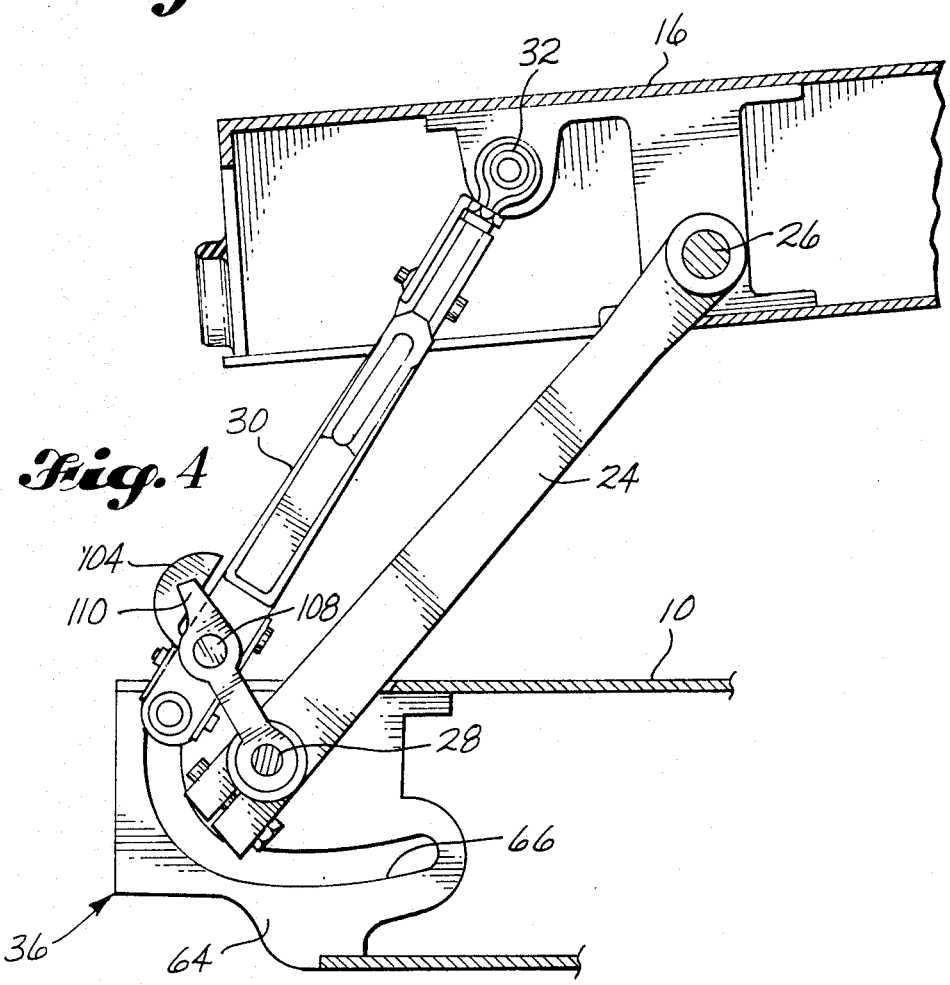
FIG. 4 is a view like FIG. 3 but shows the door in an open position.

In FIGS. 3 and 4, the door 16 is shown connected to the fuselage structure 10 by means of a link bar 24 which is pivotally connected at 26 to the door, and further pivotally connected at 28 to the fuselage structure. Also interconnecting the door 16 and the fuselage structure 10 is a guide bar 30 which makes up a first member of the device 22. Similar to the link bar 24, the guide bar 30 is pivotally connected at one end to the door 16 as shown at 32. However, the other end 34 of the guide bar 30 is a locking end which is connected to a second member of the device 22. This second member, indicated generally at 36 in FIG. 4, is fixedly connected to the aircraft structure 10.

Referring now to FIG. 6, therein is shown an enlarged sectional view of the locking end 34 of the guide bar 30. This end 34 has a forked portion 38 in which is received a locking pin 40. The forked portion 38 has an upper part 42 and a lower part 43 which are spaced from each other, and each part has bores 44, 46 which are coaxial. Received in each bore 44, 46 is a cylindrical sleeve bearing 48, 50. A hollow, generally cylindrical guide member 52 extends through both sleeve bearings 48, 50 and has outer ends 54, 56 which respectively project upwardly and downwardly out from the forked portion 38. The pin 40 is slidably received in the hollow guide member 52. Also received in this member 52 is a first spring 58 connected to a lower end 60 of the pin 40. The spring 58 is biased to push the pin 40 upwardly and out through an opening 59 in the upper end 54 of the cylindrical guide member 52.

The second member 36 of the device 22 is a bracket-like member having upper and lower plates 62, 64 as shown in FIG. 2. FIG. 4 shows the lower plate 64. As can be seen, the lower plate has a channel 66 which guides the lower outer end 56 of the guide member 52 as the door 16 swings open and closed. Similarly, the upper plate 62 also has a channel 68 (see FIGS. 5-7) which runs parallel to the lower channel 66 and which guides the upper end 54 of the guide member 52.

When the door 16 is open, the link bar 24 and guide bar 30 are in the position shown in FIG. 4. An opening 70 (see FIGS. 2 and 6) is positioned in the upper channel 68 for receiving and engaging with the end 72 of the locking pin 40. When the device 22 is armed for locking, the spring 58 moves the pin's end 72 into engagement with the opening 70. Disarming and arming of the device 22 will now be described by referring to FIGS. 10-13.

Pivotally connected to the locking end 34 of the guide bar 30 is a lever member 74 and a cam member 76. These connections may be made by any suitable means, or as shown in FIG. 14, where the cam member 76 is connected to the guide bar 30 by a pin 78 and roller assembly 80, both of the latter extending through a bore 82 in the guide bar. The pin 78 and roller assembly 80 turn together with the cam member as it rotates.

A wire spring 84 is connected to both the lever member 74 and the cam member 76. The spring 84 has a coiled portion or spring 86 which is suitably connected to the lever member 74 and biased to normally pivot the lever member in a clockwise direction. This coiled portion will hereafter be referred to as the "second" spring 86. Another coiled portion 87 of the spring 84, hereafter the "third" spring 87, is similarly connected to the cam member 76, but is biased to normally pivot the cam member in a counter-clockwise direction.

One end portion 88 of the lever member 74 has a slot 90 connected to an outwardly projecting trunnion portion 92 of an annular collar 94. Referring to FIGS. 6, 7 and 12, the collar 94 surrounds and is in sliding contact with the outer surface of the central portion 91 of the hollow guide member 52. This portion 91 is slightly larger in diameter than the guide member's upper and lower ends 54, 56 and is located between the upper and lower parts 42, 43 of the forked portion 38. Extending through the locking pin 40 is a horizontal pin 95 which further extends outwardly through parallel slots 96, 97 in opposing sides of the guide member's central portion 91. The ends of the pin 95 project outwardly a sufficient distance so that they will contact the lower surface 93 of the collar 94 when the lever member 74 is rotated counter-clockwise. In this manner, pivotal movement of the lever member 74 counter-clockwise drivingly connects the end portion 88 of the lever member to the locking pin 40. When the lever member 74 is so turned, the collar 94 is driven downwardly which in turn contacts the pin 92 and causes the locking pin 40 to be pushed downwardly against the bias of the first spring 58. This movement, of course, would be used to disengage the pin's end 72 from the opening 70 in the upper channel 68. When the lever member is pivoted in the opposite sense, the collar 94 moves upwardly away from the ends of the pin 95 thereby permitting the first spring 58 to push the locking pin 40 upwardly.

The lever member 74 has a second end portion 98 that travels in an arcuate path as the lever member pivots. This second end 98 is shaped to function as a cam lobe which abuts against a similar cam lobe portion 102 of the cam member 76. Normally, the cam member 76 is in the position shown in FIG. 10. Its cam lobe 102 projects into the arcuate path traveled by the cam lobe 100 of the lever member 74. When the lever member 74 is pivoted in the above-described manner to disengage the pin 40, the cam lobe 100 of the lever member 74 slides against the cam lobe 102 of the cam member 76 and causes the cam member to pivot clock-wise until the lever member's cam lobe 100 bypasses the cam member's lobe 102. Then, the third spring 87 causes the cam member 76 to pivot in the opposite direction and return to its normal position as shown in FIG. 11. This prevents the lever member from pivoting back and thus disarms the device 22 so that the door 16 can be moved.

The turning of the lever member 74 in the above manner would be accomplished by a handle 104 on the other side of the guide bar. This handle 104 is fixedly connected to the lever member 74 so that the lever member pivots in correspondence with manual pivoting of the handle 104. As can be seen in FIGS. 2, 5 and 8, the handle 104 is connected to the collar 94 in the same manner as the lever member 74 so that the handle and lever member cooperate to drive the collar 94 downwardly.

Directing attention once again to FIG. 11, the device 22 is shown therein in a disarmed or unlocked condition and would permit the locking end 34 of the guide bar 30 to be moved relative to the upper and lower channels 68, 66 to close the door 16. While the door 16 is moving toward the closed position, the device 22 would be rearmed by a hinge link 106. This hinge link 106 is pivotally connected to the fuselage structure 10 at the same location 28 as the link bar 24, and also pivotally connected at 108 by a pin 109 to the top of the guide bar's locking end 34. This type of connection causes a generally outwardly projecting end 110 of the hinge link 106 to move rotationally relative to the guide bar's end 34 as the door closes. When this happens the hinge link's projecting end 110 briefly abuts against and pivots a generally upwardly projecting portion 112 of a cam-shaped trigger member 114. This is best seen in FIG. 13. The trigger member 114 is fixedly connected to the cam member 76 by means of assembly 80 so that the cam member and trigger member pivot together as shown in FIG. 14. This causes the cam lobe 102 to move out of the arcuate path traveled by the lever member's lobe 100, with the result that the second spring 86 pivots the lever member 74 clock-wise so that the collar 90 is no longer operative to push or drive the locking pin 40 downwardly. The locking pin 40 would then be in the position shown in FIG. 7 and armed to be moved by the spring 58 into engagement with the upper channel's opening 70. This, of course, would not happen until the door was once again opened to the position shown in FIG. 1.

The locking device described above represents a new and useful advancement in the art. It is to be understood that the above description is not meant to limit the scope of any patent rights which may arise from the subject matter disclosed above. Rather, the scope of any patent protection obtained is to be limited only by the claims which follow, wherein such claims are to be interpreted in accordance with the well-established doctrines of patent claim interpretation.

What is claimed is:

1. For a door mounted to a structure, a locking device for holding said door open, comprising:

a first member connected to said door, wherein said first member moves between locking and unlocking positions correspondingly with opening and closing movement of said door;

a second member fixedly connected to said structure, said second member including means for defining a predetermined path along which said first member moves during said opening and closing movement;

a locking pin connected to said first member, said pin being movable along an axis between an engagement position and a nonengagement position, wherein said second member has an opening positioned to receive an end of said pin when said pin is in said engagement position and when said first member is in said locking position;

first spring means biased for normally moving said pin along said axis into said engagement position;

a lever member pivotally connected to said first member, and having a portion drivingly connected to said pin in a manner so that said pin moves axially against the bias of said first spring means and into said nonengagement position in response to pivotal movement of said lever member in a first rotational direction, said lever member further having a cam lobe portion that moves along an arcuate path when said lever member pivots;

second spring means biased for normally pivoting said lever member in a second rotational direction opposing said first direction;

a cam member pivotally connected to said first member and positioned adjacent said lever member, said cam member having a cam lobe portion normally positioned to project into said arcuate path of said lever member's cam lobe portion;

third spring means biased for normally pivoting said cam member in the same direction as said first direction of rotation; and lock arming means, connected to said cam member, for pivoting said cam member in the same direction as said second rotational direction, said lock arming means being operable to pivot said cam member in response to movement of said first member along said path, and to pivot said cam member a sufficient amount so that said cam member's lobe portion moves out of said arcuate path of said lever member's cam lobe portion.

2. The device of claim 1, wherein said lock arming means includes:

a trigger member pivotally connected to said first member and drivingly connected to said cam member in a manner so that pivotal movement of said trigger member causes corresponding pivotal movement of said cam member, said trigger member having a cam portion that normally extends upwardly;

a hinge link member having a portion pivotally connected to said second member and another portion pivotally connected to said first member, and further having a projecting end portion, wherein movement of said first member relative to said second member corresponding to opening and closing movement of said door causes said hinge link member's projecting end portion to rotate relative to said first member, said cam portion of said trigger member being positioned adjacent said projecting end portion so that such rotation causes said end portion to slide against said cam portion and pivot said trigger member, to further pivot said cam member so that said cam lobe portion thereof may move said arcuate path of said lever member's cam lobe portion.

3. The device of claim 2, wherein said first member includes a forked portion having an upper part and a lower part in spaced relationship to each other, each part having a bore, wherein said bores are in coaxial relationship to each other, and including a hollow, generally cylindrical guide member having a central portion positioned in the same space between said upper and lower parts, said guide member further having an upper portion extending through said upper bore, said upper portion having an upper end that projects outwardly above said upper part of said forked portion, said guide member still further having a lower portion extending through said lower bore, said lower portion having a lower end that projects outwardly below said lower part of said forked portion, and wherein said means for defining a predetermined path includes an upper and lower track, said upper track being positioned to guide said upper end of said guide member, and said lower track being positioned to guide said lower end of said guide member, respectively, when said first member moves relative to said second member, said pin engaging opening in said second member being located in said upper track, wherein an opening in said upper end of said guide member moves into registration with said pin engaging opening when said first member is in said locking position, and still further, said locking pin being slidably received in said hollow guide member, and said first spring means being received in said guide member and positioned to push said locking pin upwardly and outwardly through said opening in said upper end of said guide member, to engage said locking pin end with said opening in said upper track when said guide member upper end moves into registration therewith.

4. The device of claim 3, wherein said central portion of said hollow guide member includes an outer surface positioned between said upper and lower parts of said forked portion, and includes a pair of parallel slots, each being positioned in said outer surface opposite the other, and including an annular collar surrounding said outer surface, said collar being drivingly connected to said lever member in a manner so that pivotal movement of said lever member causes said collar to move upwardly or downwardly adjacent said outer surface depending on the direction of said pivotal movement, and including a horizontal pin extending transversely through said locking pin, said horizontal pin's outer ends each extending outwardly through one of said slots a sufficient distance so that a bottom surface of said annular collar contacts said outer ends as said collar moves downwardly, to thereby push said horizontal pin and said locking pin downwardly against the bias of said first spring means.

5. The device of claim 1, wherein said first member includes a forked portion having an upper part and a lower part in spaced relationship to each other, each part having a bore, wherein said bores are in coaxial relationship to each other, and including a hollow, generally cylindrical guide member having a central portion positioned in the same space between said upper and lower parts, said guide member further having an upper portion extending through said upper bore, said upper portion having an upper end that projects outwardly above said upper part of said forked portion, said guide member still further having a lower portion extending through said lower bore, said lower portion having a lower end that projects outwardly below said lower part of said forked portion, and wherein said means for defining a predetermined path includes an upper and lower track, said upper track being positioned to guide said upper end of said guide member, and said lower track being positioned to guide said lower end of said guide member, respectively, when said first member moves relative to said second member, said pin engaging opening in said second member being located in said upper track, wherein an opening in said upper end of said guide member moves into registration with said pin engaging opening when said first member is in said locking position, and still further, said locking pin being slidably received in said hollow guide member, and said first spring means being received in said guide member and positioned to push said locking pin upwardly and outwardly through said opening in said upper end of said guide member, to engage said locking pin end with said opening in said upper track when said guide member upper end moves into registration therewith.

6. The device of claim 5, wherein said central portion of said hollow guide member includes an outer surface positioned between said upper and lower parts of said forked portion, and includes a pair of parallel slots, each being positioned in said outer surface opposite the other, and including an annular collar surrounding said outer surface, said collar being drivingly connected to said lever member in a manner so that pivotal movement of said lever member causes said collar to move upwardly or downwardly adjacent said outer surface depending on the direction of said pivotal movement, and including a horizontal pin extending transversely through said locking pin, said horizontal pin's outer ends each extending outwardly through one of said slots a sufficient distance so that a bottom surface of said annular collar contacts said outer ends as said collar moves downwardly, to thereby push said horizontal pin and said locking pin downwardly against the bias of said first spring means.

* * * * *